United States Patent [19]

Laskaris et al.

[11] Patent Number: 5,010,870
[45] Date of Patent: Apr. 30, 1991

[54] PORTABLE ENGINE-PUMP ASSEMBLY

[75] Inventors: Michael A. Laskaris, Collegeville; Kalman Broitman, Dresher; Richard E. Teske, Norristown; David L. Miller, Conshohocken; Michael Sulmone, Trooper, all of Pa.

[73] Assignee: Hale Fire Pump Company, Conshohocken, Pa.

[21] Appl. No.: 507,670

[22] Filed: Apr. 10, 1990

[51] Int. Cl.$^5$ .............................................. F02B 1/00
[52] U.S. Cl. ..................................... 123/576; 123/1 A
[58] Field of Search ................ 123/576, 1 A; 417/364

[56] References Cited

U.S. PATENT DOCUMENTS

| | | | |
|---|---|---|---|
| 3,799,125 | 3/1974 | Hutchinson | 123/576 |
| 4,570,605 | 2/1986 | Eberhardt | 123/576 |
| 4,712,516 | 12/1987 | Eberhardt | 123/576 |
| 4,955,326 | 9/1990 | Helmich | 123/576 |

Primary Examiner—E. Rollins Cross
Attorney, Agent, or Firm—Frank A. Follmer

[57] ABSTRACT

An engine for a portable engine-pump assembly is designed to operate on a safe fuel such as JP5 or DFM. The engine is started by a starting fuel such as propane which is supplied to the engine from a pressurized propane-containing cartridge. The propane starting system uses a puncturing device which has a built-in check valve function to isolate the propane system from moisture and contaminants in the air.

14 Claims, 9 Drawing Sheets

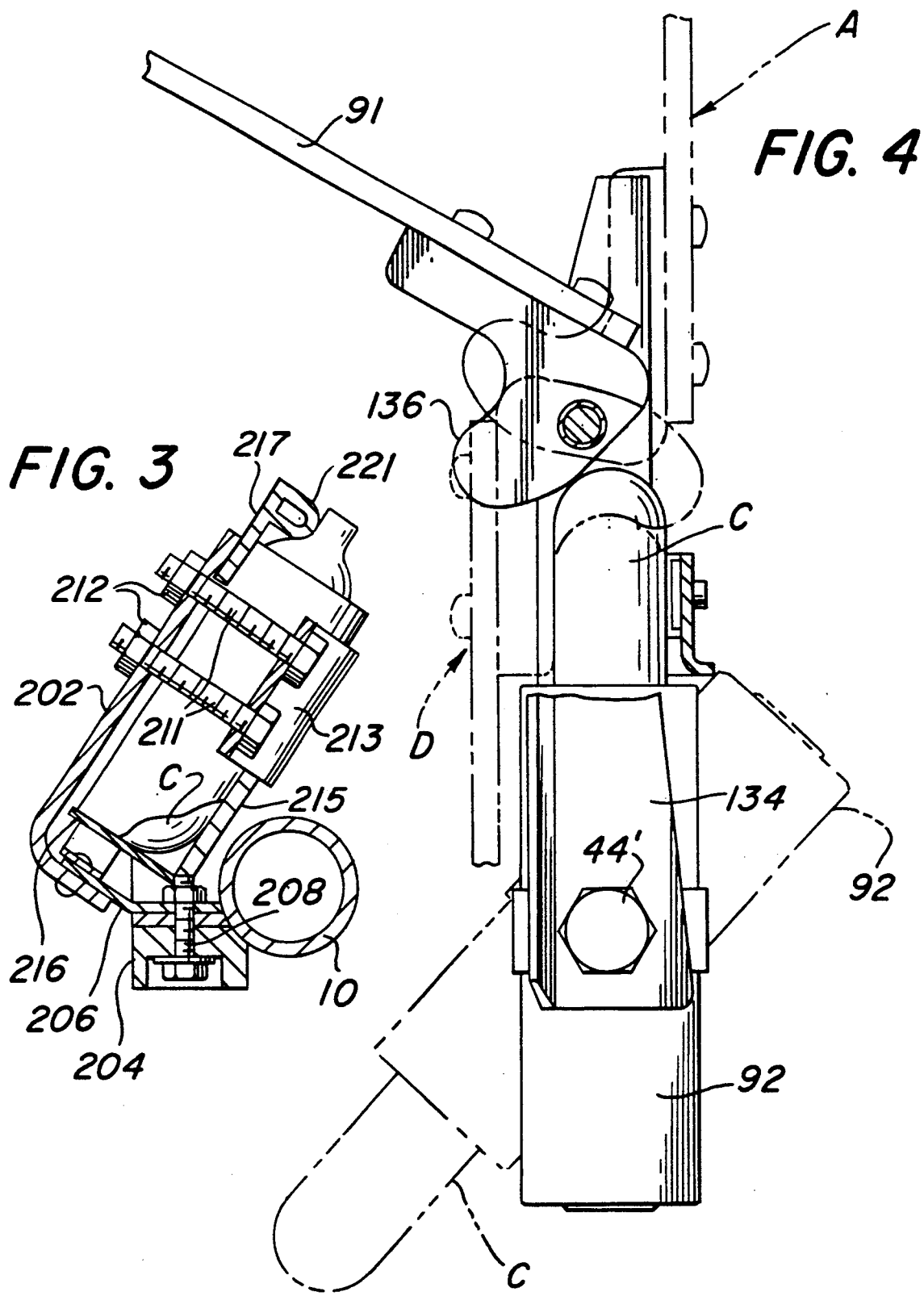

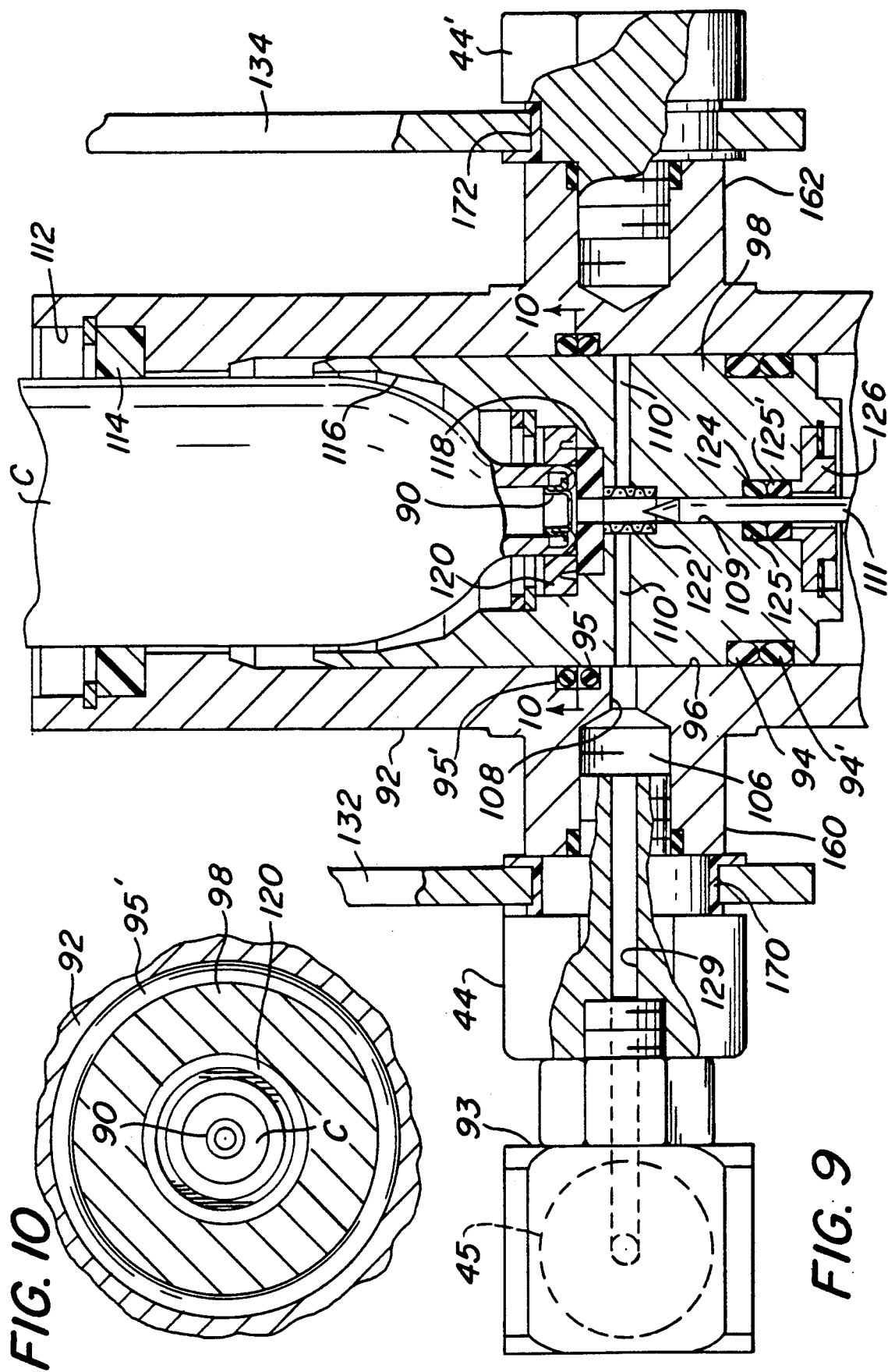

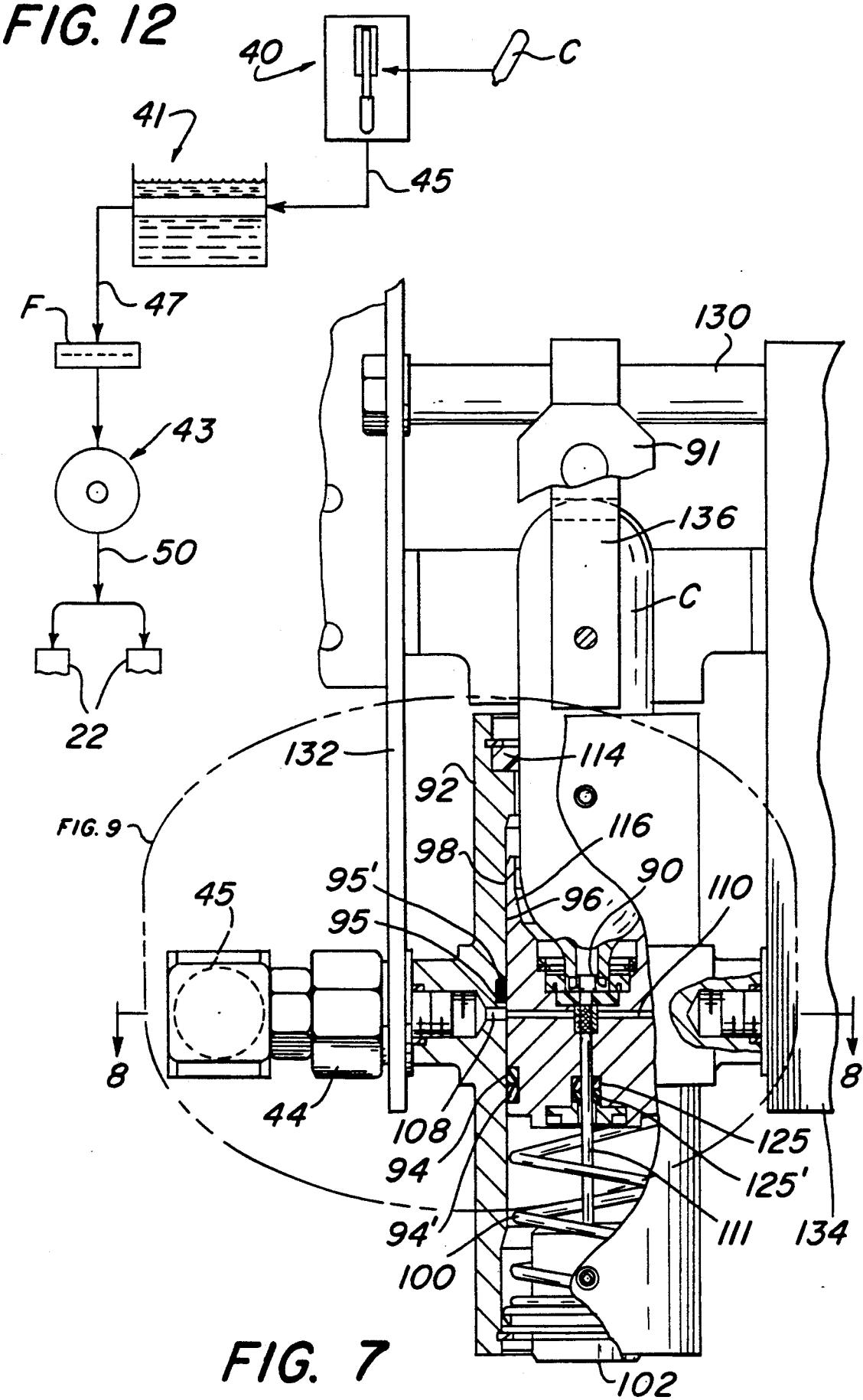

PORTABLE ENGINE-PUMP ASSEMBLY

BACKGROUND AND SUMMARY OF THE INVENTION

In many applications, such as on board ships, there is a need for a lightweight, portable, engine driven pump unit. For example, such units are used as portable firefighting pumps or dewatering pumps. Present-day pump units of the indicated type generally utilize a two-stroke gasoline engine for driving the pump because this engine is light in weight. However, the use of gasoline as the fuel for the engine involves inherent safety problems because gasoline is so highly flammable.

Prior art engine-pump assemblies of the indicated type are disclosed in U.S. Pat. Nos. 4,643,652 and 4,690,613 wherein there is shown a unit wherein the pump is driven by a high speed, lightweight, gasoline engine of the two-cycle type used in outboard engines. The engine is arranged with a vertical crankshaft coupled to a vertical pumpshaft for driving the same.

It is an object of the present invention to provide an engine for use with a pump unit of the indicated type which is adapted to operate on a safe fuel such as kerosene based jet fuels like JP5 or diesel fuels such as DFM.

In accordance with this object, an engine that is designed to operate on gasoline is modified so as to operate with a kerosene based fuel JP5 as its fuel. One of the main difficulties to be overcome in operating a gasoline type engine of a fuel like JP5 is that JP5 has a much higher viscosity than gasoline, particularly at low temperatures. For example, at $-50°$ C. the viscosity of gasoline is 1.7 cs. while the viscosity of JP5 is 15.0 cs. Further, at 50° C. the viscosity of gasoline is 0.5 cs. while the viscosity of JP5 is 1.1 cs.

In accordance with this object of the invention, in order to compensate for the higher viscosity of JP5, there is provided a novel carburetor means. More specifically, the idle and high speed fuel flow restrictions are made substantially larger than in a corresponding gasoline engine carburetor and the idle air bleed of a gasoline type carburetor is eliminated or plugged to thereby produce a much higher fuel flow at idle speed than with a comparable gasoline-type carburetor. This design compensates for the fact that JP5 does not burn as efficiently as gasoline especially at low throttle settings or engine speeds. In furtherence of this object of the invention, a fuel enrichment sub-system is provided. This system is constructed and arranged to bypass the high speed orifice and the idle tube orifice to compensate for the increased viscosity at extremely low temperatures. This enrichment system ensures that the system can flow enough fuel at low temperatures to maintain stable engine operation. A fuel enrichment needle valve controls the flow and is opened more as the temperature drops. The needle valve may be operated manually or controlled by a thermostat means to make the operation automatic. More specifically, the design is such that the fuel enrichment needle valve is fully open at the low point of temperature operation, i.e., $-20°$ F., and gradually closes proportionately as the ambient operating temperature increases up to 60° F. It will be apparent that in the fully-open position, the fuel flow is much richer than the other partially-open positions of the needle valve.

Another object of the invention is to provide a novel means for supplying a starting fuel of high volatility for use in starting the engine. While the engine will run well on JP5 once it is started and warmed up, there is a need for some starting assistance in order to start a cold engine. To this end, there is provided a novel starting fuel supply means comprising a sealed, pressurized cartridge containing a supply of the starting fuel, namely, propane. The cartridge is relatively small, structurally strong and explosion proof and is similar to the type of $CO_2$ cartridges used for life vests. These cartridges have a burst pressure over 7000 PSI while propane has a room temperature vapor pressure of less than 150 PSI. Further, since only about 10–11 grams of propane are contained in each cartridge, they are very safe from a fire hazard point of view. It is noted that one cartridge provides all the propane required to start the engine at room temperature, although in cold conditions, more than one cartridge may be required.

A feature of the starting fuel supply means is that the flow of propane from a punctured cartridge to the engine carburetor is provided with an evaporator means, such evaporator means comprising an evaporator installed in the water pump priming bowl. This is done so that the heat from the sea water used to prime the pump can be utilized for the evaporation of propane in very cold conditions. It is noted that the boiling point of propane ($-44°$ F.) is so close to the low temperature requirement ($-20°$ F.) that the heat from the sea water ($+28°$ F.) is necessary to ensure consistent propane evaporation and reliable starting.

Another feature of the starting fuel supply means is the construction of the puncturing device which, in addition to puncturing the propane cartridge is provided with a built-in check valve function. To this end, when the cartridge is removed from the device, the check valve means closes and isolates the propane system from moisture and contaminants in the air, as well as preventing the escape of residual propane vapors into the atmosphere. Further, the sealing is enhanced by the provision of O-ring grooves in the puncture device that are twice as wide as normal to allow two O-rings of different compounds in each groove without the use of a back-up ring. This allows the puncture device to function properly from $-44°$ F. through 140° F. This range of operation would not be possible with only one O-ring compound.

Another improvement in the starting fuel supply means is the provision of a propane regulator that has a shut-off feature that prevents the propane that has flowed through the puncture device and the evaporator from entering the engine until a manifold vacuum is present. The manifold vacuum produced as a result of pulling the engine start rope is sufficient to make the propane flow to the engine. Further, a prime button is provided on the regulator to bypass the shutoff function and for use in priming the engine with propane for quicker starts.

Another improvement in the starting fuel supply means is the provision of a storage rack for the cartridges that is mounted to the pump unit frame. This storage rack is designed to retain eight propane cartridges and also to protect these cartridges from heat and fire should the pump unit be engulfed in flames. To this end, the body of the cartridge tube is insulated while the end cap is exposed whereby not only is the maximum safe exposure time to fire greatly increased, but also the ultimate cartridge rupture is done in a controlled fashion. Further, since the body is cooler (because it is insulated from the fire) than the bottle tip, the bottle tip will rupture first in a prolonged immersion in fire. Accordingly, this produces a controlled plume of flame instead of an explosion and the cartridge remains in the storage rack to thereby eliminate possible shrapnel or explosion hazards.

BRIEF DESCRIPTION OF THE DRAWINGS

FIG. 3 is a sectional view taken on line 3—3 of FIG. 1 and showing the cartridge storage rack.

FIG. 4 is a side elevational view of part of the cartridge puncturing device in accordance with the invention.

FIGS. 5, 6 and 7 are front elevational views, partly in section, of the cartridge puncturing device showing the piston in different positions.

FIG. 9 is an enlarged view of the part of the puncturing device encircled in FIG. 7.

FIG. 10 is a sectional view taken on line 10-10 of FIG. 9.

FIG. 12 is a schematic view of the propane fuel system in accordance with the invention.

DETAILED DESCRIPTION OF THE PREFERRED EMBODIMENTS

Figure 1:
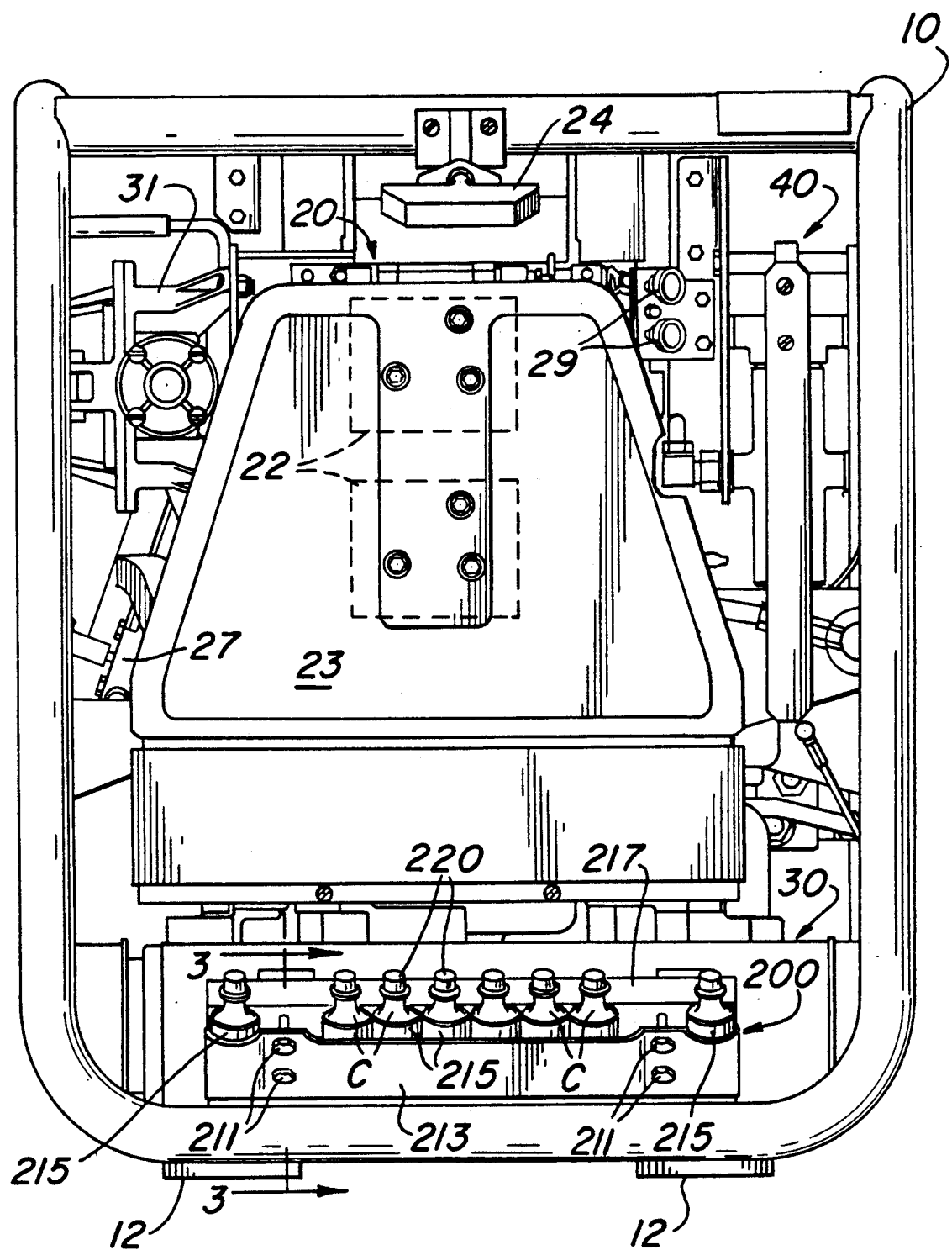
FIG. 1 is an elevational view of an engine-pump assembly in accordance with the invention.

The engine pump assembly in accordance with the invention comprises a frame 10 including a plurality of extruded aluminum tubes welded together to form an open box-like structure as shown in the Drawings. A pair of angle members extend horizontally across the bottom of the frame 10 and have a pair of plastic pads 12 bolted thereto for use in supporting the frame 10 in an upright position as shown in FIG. 1.

Figure 11:
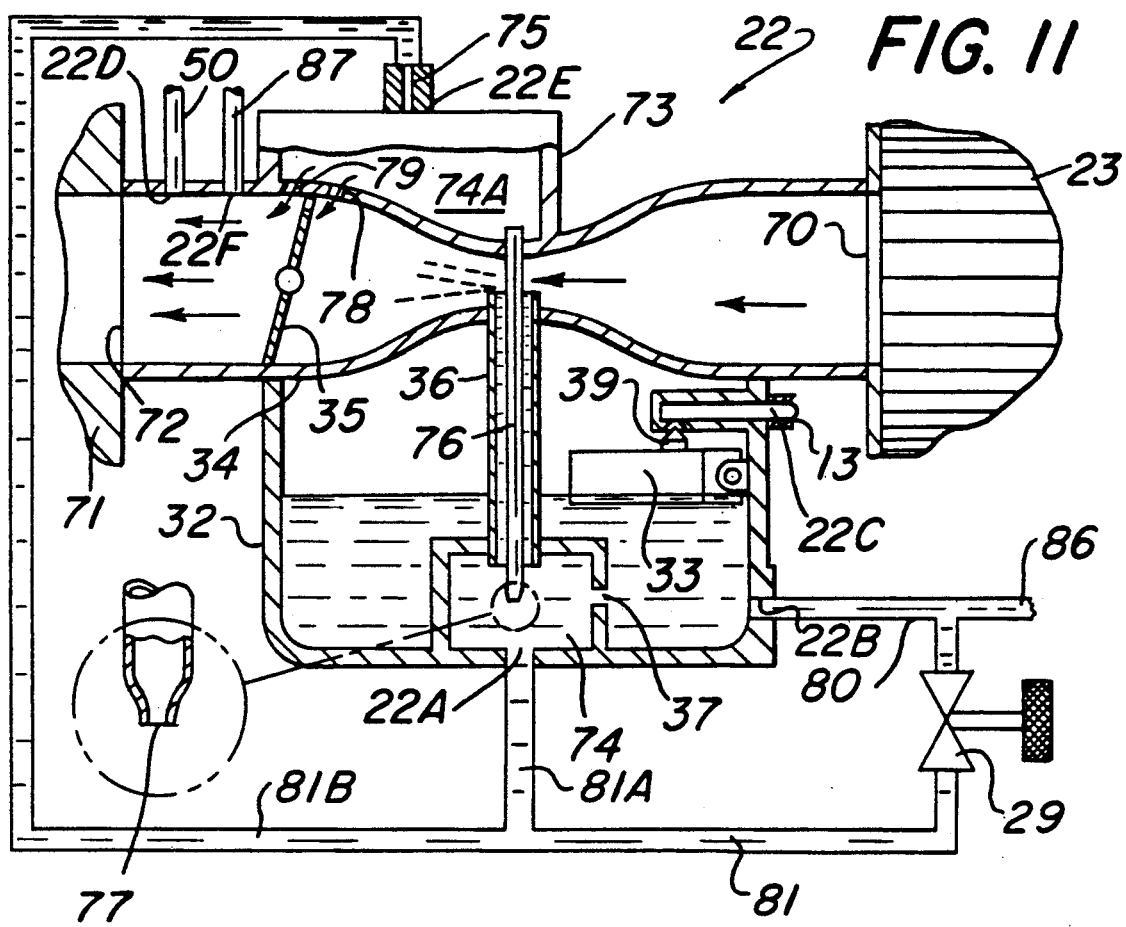
FIG. 11 is a partly diagrammatic view of the carburetor means in accordance with the invention.

An engine 20 is mounted on frame 10 by a shock absorbing mounting means with its crankshaft extending vertically. Engine 20 is a lightweight, high speed engine of the marine engine type, such as, for example, a 55 horsepower, two-cylinder, two-cycle water cooled marine engine. Engine 20 provides the power necessary to turn the pump impeller, the pump being indicated generally at 30 and being of the type described in detail in U.S. Pat. No. 4,690,613. Engine 20 is provided with the usual conventional elements including a fixed ratio fuel/oil injection pump 21, a pair of carburetors 22, an air filter 23, a starter of the recoil rope type having a handle 24, a fuel tank 25, an oil reservoir 26, a fuel primer 27 and a throttle means (FIG. 11). Engine 20 is constructed in accordance with the novel features of the invention for starting with propane and operating with JP5 fuel as will be described in detail hereafter.

Briefly stated, and as is described in detail in said patent, the pump 30 consists of a single stage centrifugal pump directly driven by the engine 20. The pump 30 is mounted within frame 10 immediately beneath engine 20 and is mounted on the underside of engine 20 by a plurality of mounting screws (not shown) with its pump shaft extending vertically and in alignment and concentric with the engine crankshaft. The pump 30 is a double-suction centrifugal pump and has its impeller mounted on and keyed to the pump shaft for rotation within a volute chamber. The pump 30 is provided with priming means in the form of a diaphram priming pump 31 in addition to priming by the filling of the pump through a priming port 11 as is conventional.

Figure 2:
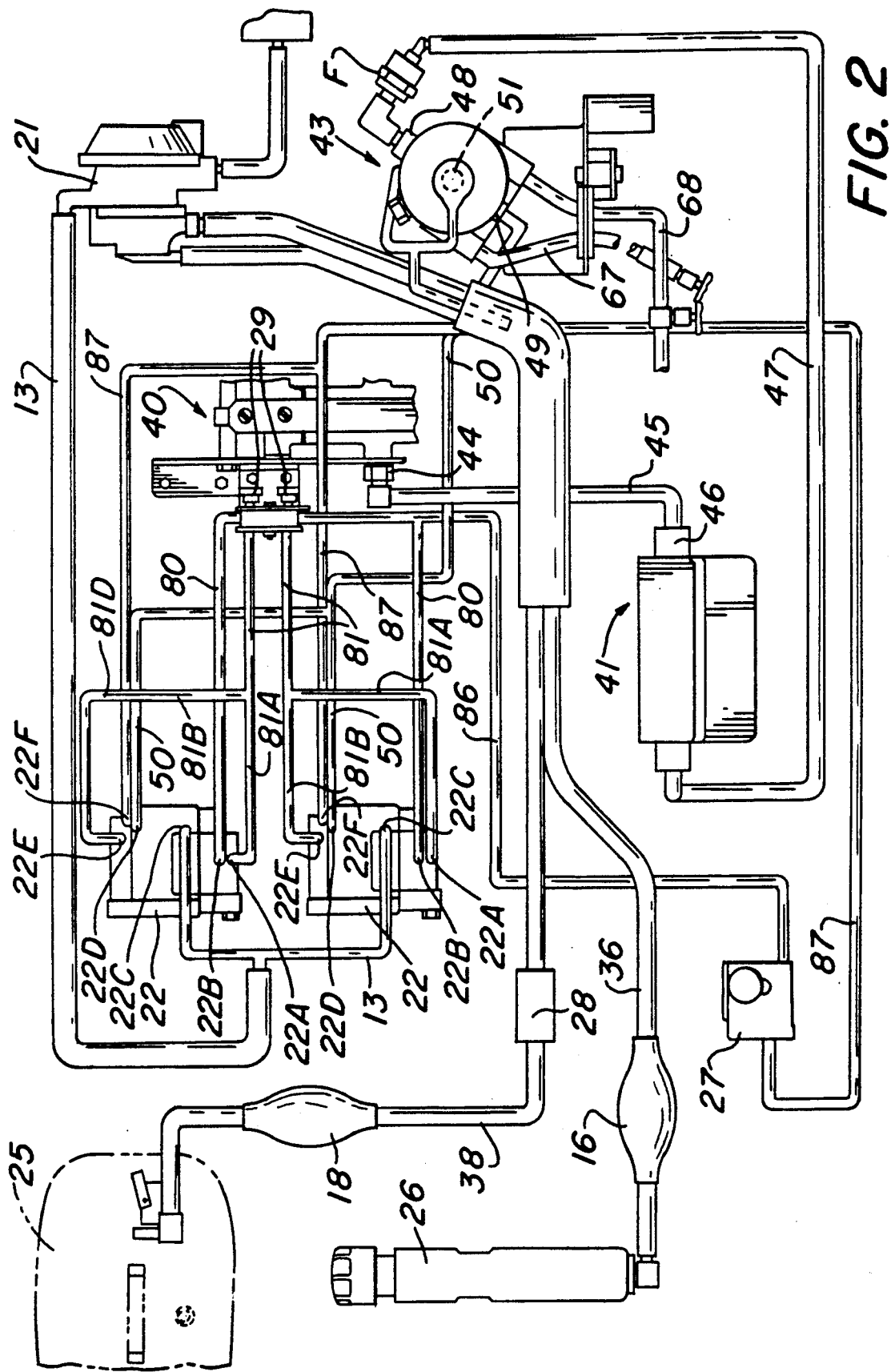
FIG. 2 is a layout view of the fuel system for the engine-pump assembly shown in FIG. 1.

The engine fuel and oil are pumped from separate reservoirs 25 and 26 and mixed at the proper ratio by the pump 21. This arrangement is shown in FIG. 2 and will be described more fully hereafter.

The engine 20 is provided with dual carburetors 22, one for each cylinder, which are heated by the engine cooling water to prevent carburetor ice-up during cold and humid weather. Each carburetor 22 is a single-barrel, float feed type with a fixed high speed jet and a fixed low speed jet. The throttle valve is synchronized with the ignition system by a throttle control cam connected to the throttle linkage and the cam follower located on the carburetor body, a cam follower being linked to the valve shaft. This arrangement is in accordance with conventional design.

Further, the carburetors 22 mix fuel and air in proportions determined by engine speed requirements. As shown in FIG. 11, fuel is held in a small bowl 32 with a pivoted float 33 operating an inlet valve 39 which allows fuel to be replaced through a fuel supply line 13 as it is consumed. Engine piston movement creates alternating conditions of pressure and partial vacuum in the crankcase. Atmospheric pressure trying to fill the partial vacuum creates a flow of air through the carburetor throat 34. A narrowing in the carburetor throat 34, i.e., the venturi, causes the air passing through the venturi to increase the velocity and decrease the pressure. The difference in air pressure over the high speed tube 36 and atmospheric pressure in the flow chamber of bowl 32 causes fuel to be pushed up the high speed tube 36 and into the air stream and the throat 34 of the carburetor 22. During operation, a throttle valve 35 works to control the amount of fuel/air mixture fed to the engine crankcase and the ratio of fuel to air. Also, a fixed high speed orifice 37 ensures an even flow of fuel up the high speed tube 36. It is noted that fuel must past through the high speed orifice 37 before it rises up the high speed tube 36.

The above-described arrangement is conventional in carburetor construction.

In accordance with the invention, there is provided a novel carburetor means wherein each carburetor 22 is modified in a manner to compensate for the high viscosity of JP5 fuel when operating in extremely cold temperatures. To this end, a novel fuel enrichment system is provided, which system includes a separate needle valve 29 for each carburetor 22, each valve 29 being connected in an arrangement whereby the flow therethrough bypasses the main carburetor jets.

Further, in accordance with the invention, the fuel supply to the engine 20 comprises a novel propane system which is used for the starting of the engine 20 on propane, which system is necessary since the engine will not start directly on the JP5 fuel.

The general arrangement and major elements of the novel carburetor means and the novel propane system are shown in FIG. 2, which is a layout of the fuel system in accordance with the invention. Referring to this figure, the JP5 fuel is contained in fuel tank 25 which is arranged to supply fuel through a fuel line 38 containing a fuel primer bulb 18 and a fuel filter 28 to the fixed ratio pump 21. From the pump 21, a mixture of fuel and oil is delivered to the upper and lower carburetors 22 by fuel supply lines 13. Oil is supplied to the pump 21 from an oil reservoir 26 through a supply line 36 containing an oil primer bulb 16. The two carburetors 22 have the same novel construction in accordance with the invention as shown in detail in FIG. 11. The novel features of the carburetor means will be described hereafter.

FIG. 2 shows the basic components of the propane system, which is shown schematically in FIG. 12. Thus, the propane system consists of three basic components, namely, the propane cartridge puncturing device 40, the evaporator 41, the regulator 43, in addition to the propane cartridges C and a filter F.

Figure 13:
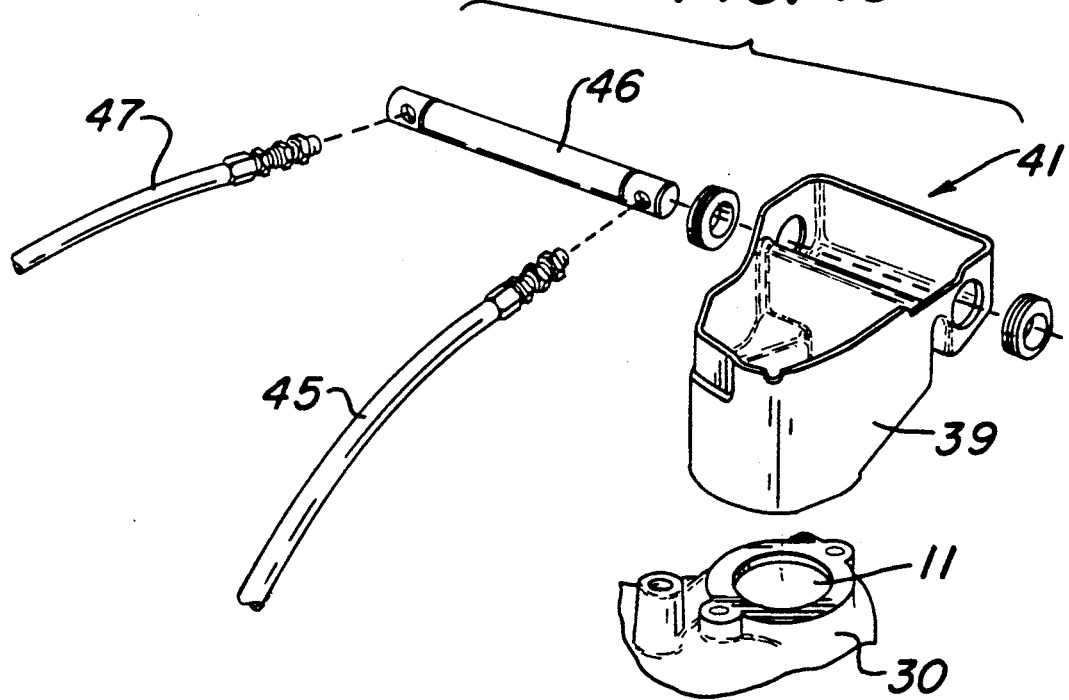
FIG. 13 is a detail view of the propane evaporator.

In the operation of starting an engine 20 on propane, a cartridge C is removed from the storage rack 200 mounted at the lower end of the frame 10 and inserted into the puncturing device 40 which is mounted on the right side of the frame 10 as viewed in FIG. 1. The puncturing device 40 will be described in detail hereafter. Briefly, the cartridge C placed in the puncturing device 40 is punctured and propane gas is routed out of the side fitting 44 of the puncture device body and through a high pressure hose 45 to the evaporator tube 46 located in the priming port bowl 39 of pump 30 as shown in FIG. 13. The location of the evaporator tube 46 in the priming port bowl 39 allows the water used to prime the pump 30 in cold temperatures to aid in the evaporation process of the propane. Without the benefit of the heat absorbed from the priming water, the heat loss in vaporizing the propane could be sufficient to lower the temperature of the propane in the regulator 43 to $-44°$ F. in cold ambient temperatures. This temperature is the boiling point of propane and if such a temperature drop should occur, the operation of the system at that temperature would be unreliable.

From the evaporator 41, propane flows through a line 47 containing a propane filter F and into the inlet 48 of the propane regulator 43. The propane is delivered to the engine 20 by way of line 50 which is connected to the regulator outlet 49. The regulator 43 is of a type known in the art, such as the Model S-3 regulator available from the Garretson Equipment Company. The regulator 43 is constructed to function by blocking the flow of propane to the engine 20 unless the engine 20 is either running or being cranked. The engine vacuum created by the engine 20 when it is running or being cranked operates a diaphram in the regulator 43 so that when the engine vacuum level exceeds ½ inch of water, the diaphram will move far enough to open the regulator valve and allow propane to flow through outlet 49 to the engine 20. The regulator 43 is also provided with a primer button 51 which can be used to fill the fuel supply hose 50 downstream from the regulator 43 with propane in order to ensure quicker starts if this is desired.

Figure 14:
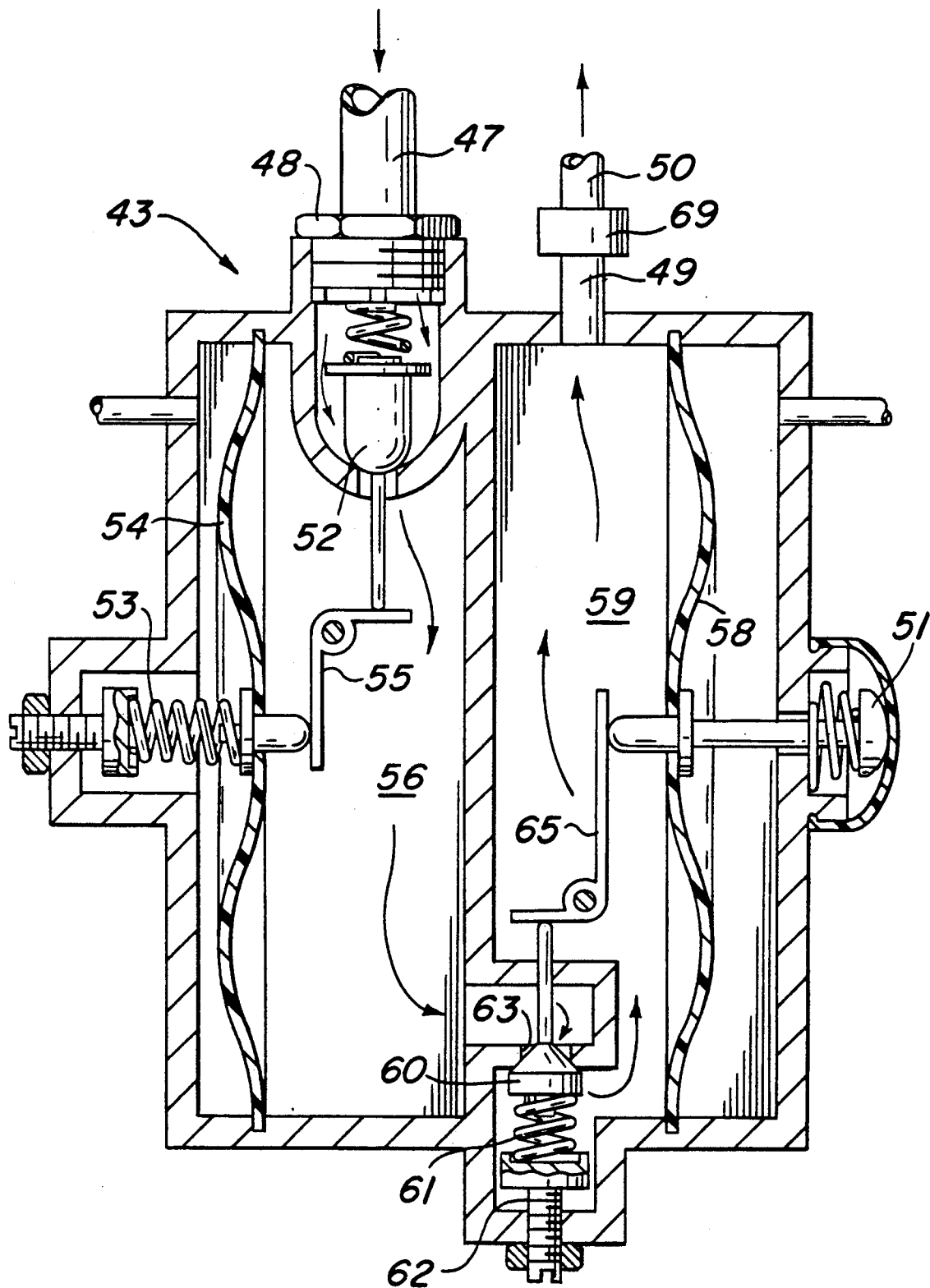
FIG. 14 is a diagrammatic view of the propane flow in the regulator.

The propane regulator 43 is shown diagrammatically in FIG. 14 and is of the type used conventionally as a vaporizing two-stage fuel controller with liquid LP-gas. Regulator 43 is essentially a two-stage device with the first stage reducing the inlet pressure from 150 PSI to 2 PSI and the second stage reducing the pressure to 2 inches water vacuum. The regulator 43 functions so that if no vacuum is present, i.e., the engine is not running or being cranked, the propane flow is blocked. Further, a primer button 41 is arranged to press on the secondary diaphram to override this flow blocking function when desired.

Regulator 43 comprises an inlet 48 controlled by a spring-biased valve member 52, a primary diaphram 54 defining the first stage cavity 56 on one side thereof and vented to atmosphere on the other side thereof, and a secondary diaphram 58 defining a second stage cavity 59 on one side thereof and vented to atmosphere on the other side thereof. A conventional arrangement including a primary spring 53 and a pivoted lever 55, in addition to the primary diaphram 54, operates as a valve regulator to control the pressure in the first stage cavity 56. During engine operation, the regulator 43 functions continuously and maintains a constant pressure of approximately 2 PSI in the first stage cavity 56 until the propane supply in the cartridge is exhausted. A secondary valve member 60 is arranged to control the flow between the first and second stage cavities 56 and 59 and is set by a secondary spring 61 and an adjusting means 62 as is conventional. The outlet 49 of regulator 43 is connected to the engine so as to be responsive to the air flow thereto by way of the carburetor 22 at the inlet to the engine manifold. The arrangement is such that when the engine is running, air flow to the engine manifold through carburetor 22 creates a vacuum which passes through supply hose 50 and outlet 49 into cavity 59 to act onto the secondary diaphram 58. The valve 60 of regulator 43 is set so that at 2 inches of water vacuum, atmospheric pressure forces the secondary diaphram 58 toward the vacuum, depressing a pivoted lever 65 and moving the valve member 60 away from the orifice 63 which allows the propane to flow between the first and second stage cavities 56 and 59. This flow will continue so long as the vacuum is maintained. When the vacuum ceases, the spring 61 pushes the valve member 60 against the orifice 63 shutting off the propane flow. As stated above, the prime button 51 is arranged to override the vacuum control and is operative to actuate the lever 65 to open the secondary valve member 60 for priming or quick start purposes. The propane supply hose 50 is provided with a calibration orifice 69.

Referring to FIG. 2, water is supplied from pump 30 to a water chamber (not shown) in regulator 43 by a supply line 67 and is returned to pump 30 by a return line 68. Regulator 43 is provided with a channel that runs across the face of cavity 56 in an arrangement whereby heat is transferred from the water chamber to the propane therein. To this end, the water chamber has a large surface area for good heat transfer.

The novel carburetor means in accordance with the invention will be described with reference to FIGS. 2 and 11. As discussed above, each of the carburetors 22 has the same construction, which construction is shown in detail in FIG. 11. Each carburetor 22 is a single-barrel float feed type with a fixed high speed orifice and a fixed low speed orifice and comprises a carburetor bowl 32 and a carburetor body or throat 34. As is conventional, the air-fuel mixture is delivered to the engine 20 through the throat 34 which has its inlet 70 arranged to communicate with the air cleaner 23 and its outlet 72 arranged to communicate with the engine intake manifold 71. Throat 34 has a reduced diameter portion in the center thereof providing the conventional venturi. The air-fuel mixture is drawn into the engine cylinders through the intake manifold 71 during the induction phase (or stroke) of the engine 20. Carburetor 22 is provided with a conventional throttle valve 35 for regulating flow to the engine 20. The carburetor bowl 32 (also known as the float chamber) is supplied with fuel by way of a fuel line 13 from the fuel tank 25 which contains a supply of JP5 running fuel. The level of the fuel in bowl 32 is maintained by a conventional float arrangement which controls fuel flow into bowl 32 from line 13 by means of the pivoted float 33 operating the inlet valve 39. The JP5 running fuel is delivered from bowl 32 through a plurality of small orifice-controlled fuel passage means which limit and control the quantity of fuel introduced into the air stream per unit and time. Thus, there is provided a high speed flow passage means including the high speed orifice 37 which controls flow of fuel into a small chamber 74 defined within bowl 32. The high speed tube 36 extends vertically between chamber 74 and the venturi portion of throat 34 as shown in FIG. 11 to deliver fuel from a location downstream of high speed orifice 37 to the venturi of throat 34. High speed tube 36 is known in the art as the fuel emulsion tube since it is porous to allow air to enter the fuel flow therethrough. As is conventional, there is also provided an idle speed flow passage means including an idle fuel tube 76 extending vertically within tube 36 from chamber 74 to an idle fuel well 73 which defines a chamber 74A therein located on top of the throat 34. An idle tube orifice 77 is formed at the lower end of tube 76 for controlling flow therethrough. An idle orifice 78 and an off-idle orifice 79 are provided in throat 34 to control flow between chamber 74A and the passage within throat 34. Orifices 78 and 79 are located near the upper end of throttle valve 35 as is shown in FIG. 11.

In accordance with a novel feature of the invention, a fuel enrichment system is added to the carburetor 22 in an arrangement to bypass the high speed orifice 37 and the idle tube orifice 77 so as to compensate for the increased viscosity of JP5 at extremely low temperatures. The fuel enrichment means comprises a conduit means for the flow of fuel from the carburetor bowl 32 to the high speed fuel supply passage means at a location downstream of the high speed orifice 37 to thereby bypass said orifice and from the carburetor bowl 32 to said idle speed fuel supply passage means at a location downstream of the idle tube orifice 77 to thereby bypass said orifice. Thus, a flow line 80 is connected from a port 22B in bowl 32 to the upstream side of needle valve 29 and a flow line 81 divides part of its flow to line 81A to provide flow from the downstream side of needle valve 29 to a port 22 in bowl 32 which communicates with chamber 74. Flow line 81 also divides its flow to a line 81B which extends to communicate with chamber 74A at a port 22E downstream of a fitting providing an enriched idle orifice 75. Thus, when the fuel enrichment needle valve 29 is open, fuel will be supplied from bowl 32 by way of line 80 to valve 29, from which the fuel flows through line 81 and is divided, with part of the fuel flow going through line 81A and into chamber 74 by way of port 22A to complete the bypass flow around the high speed orifice 37, and with the other part of the flow divided from line 81 passing through line 81B to communicate with chamber 74A by way of port 22E after having passed through the enriched idle orifice 75.

As stated above, the bypass flows serve to compensate for the increased viscosity of JP5 fuel at extremely low temperatures. In use, the fuel enrichment needle valves 29 are open more as the ambient temperature drops. At $-20°$ F., the low temperature test point, the needle valves 29 are fully open. As the ambient temperature increases from that point, the needle valves 29 are closed proportionately. While the needle valves 29 are shown with manual control knobs, it will be apparent that there could be provided a thermostatic control means to make the operation automatic.

As shown in FIGS. 2 and 11, each carburetor 22 is also provided with a port 22D to receive the propane supplied from line 50 and a port 22F for receiving JP5 fuel for priming purposes. To this end, the engine fuel primer 27 is arranged to draw fuel from line 80 by way of a line 86 and to deliver fuel to a line 87 which delivers fuel to port 22F for priming purposes.

The novel propane system in accordance with the invention is shown schematically in FIG. 12. The propane supply is provided by small propane containing cartridges C which are similar to the $CO_2$ cartridges used for life vests. These cartridges C have a burst pressure over 7000 PSI while propane has a room temperature vapor pressure of less than 150 PSI whereby the propane is contained in a safe manner. Each cartridge C contains only about 10-11 grams of compressed propane whereby they are very safe from a fire hazard point of view. In addition, the cartridges are designed so that if they are engulfed in a fire or high heat situation causing them to burst, they will do so along a longitudinal axis thereby creating no dangerous shrapnel. Further, one cartridge provides a sufficient quantity of propane for starting the engine at room temperature since it would normally provide about thirty seconds of engine operation. In cold conditions, more than one cartridge may be required. The neck of cartridge C has a brass puncture diaphram 90 which closes and seals the cartridge opening at the end thereof.

In an engine starting procedure, a new propane cartridge is removed from the propane cartridge storage rack 200 and, after removing an expended propane cartridge from the puncturing device 40, the new cartridge is inserted therein in a properly seated position for the puncturing thereof. The puncturing device 40 operates to puncture a cartridge by the operation of a handle 91 as will be described more fully hereafter whereby propane flows from the punctured cartridge through the puncturing device 40 and by way of high pressure hose 45 into the evaporator 41. More specifically, the propane is routed out the side fitting 44 on the puncture device body 92, through a swivel fitting 93 and hose 45 to the evaporator tube 46 located in the pump priming bowl 39. The evaporator 41 functions to allow any propane not already vaporzied to absorb heat for evaporation purposes. The location of the evaporator tube 46 in the pump priming bowl 39 allows the water used to prime the pump 30 in cold temperatures to aid the evaporation process.

By way of example, when the engine-pump assembly is being used on board ship, the heat from the sea water that is used to prime the pump 30 can be used for the evaporation of propane in very cold conditions. As stated above, the boiling point of propane ($-44°$ F.) is close to the low temperature requirement of the pump ($-20°$ F.) whereby the heat from the sea water (28° F.) can be used to ensure consistent propane evaporation and reliable starting.

The puncturing device 40 has several novel features. For example, the device is provided with a built-in check valve function so that when a cartridge C is removed, the check valve closes and isolates the propane system from moisture and contaminants in the air as well as preventing the escape of residual propane vapors into the atmosphere. Also, there are provided O-ring grooves in the puncturing device 40 that are twice as wide as normal in order to allow two O-rings of different compounds in each groove without the use of a back-up ring. This allows the puncturing device 40 to function properly from −44° F. through 140° F. This operation would not be possible with one O-ring compound.

Puncturing device 40 is shown in detail in FIGS. 4–10 and comprises the body 92 which has a hollow cylindrical portion defining an internal cylinder 96 which receives a piston 98 for slidable movement therein between various positions. Piston 98 is biased to an upper position shown in FIG. 5 (wherein body 92 is positioned to extend vertically) by a spring 100 positioned in compression between the underside of piston 98 and a valve cover assembly 102 sealed at the lower end of cylinder 96 by an O-ring 101 and held in position by a retaining ring 103.

Near its lower end, piston 98 has an O-ring groove wide enough to receive two O-rings 94 and 94' made of different compounds. Similarly, cylinder 96 has an O-ring groove wide enough to receive two O-rings 95 and 95' made of different compounds. The outside O-rings 94' and 95' are made of a compound (i.e., PRECISION 7187) capable of providing a good seal at low temperature conditions of around −44° F. (the boiling point of propane). The O-rings 94 and 95 are made of a compound (i.e., PARKER VO853-75) capable of providing a good seal at normal temperature conditions in a range down to about −20° F., said compound being much less effective at temperatures below −20° F.

Puncturing device 40 comprises puncturing means adapted to extend into the sealed end of a cartridge C for opening the same by puncturing diaphram 90 thereat to thereby release the contained pressurized propane. Such means includes a puncture pin 111 mounted to extend vertically along the central longitudinal axes of the cylinder 96 and piston 98, as is shown in the Drawings. Pin 111 is pointed at its upper end and is secured at its lower end into a cylindrical portion of the valve cover assembly 102. By this arrangement, the pin 111 is fixedly mounted to extend vertically so that the puncturing action can be achieved by the downward movement of a cartridge C onto the pointed upper end of the pin 111 as will be described hereafter.

There is provided means for supporting a cartridge C in an inverted position with its sealed end above and in alignment with pin 111 and for guiding the cartridge onto pin 111 to achieve the puncturing action of breaking diaphram 90 extending across the cartridge sealed end. To this end, the upper end of body 92 is provided with a cylindrical opening 112 having an annular seal 114 extending therearound and held in position by a conventional retaining ring as is shown in the Drawings. Seal 114 serves to hold the cartridge at the wide body portion thereof in position within the puncturing device and during the puncturing operation. Seal 114 also serves to seal water and contaminants from the puncture device. Also, the upper end of piston 98 is provided with a plurality of bores of various diameters providing a cavity 116 for receiving the lower end of a cartridge C. The lowermost and smallest diameter bore in cavity 116 is provided with a face seal washer 118 adapted to support the lower end of a cartridge C in the position as best shown in FIG. 9. Above the face seal washer 118 there is provided lip seal 120 adapted to contact and seal the outer surface of the necked down end of a cartridge C at the lower end thereof. By this arrangement, the cartridge seals on the piston 98 at the two places provided by the face seal washer 118 and the lip seal 120 to thereby prevent the leakage of propane to the outside of the puncturing device 40 during use.

Figure 8:
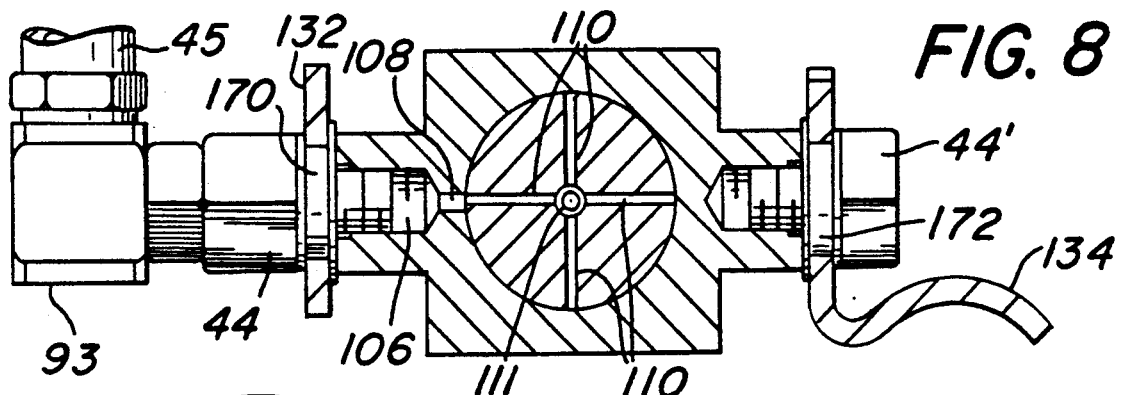
FIG. 8 is a sectional view taken on line 8—8 of FIG. 7.
Figure 6:
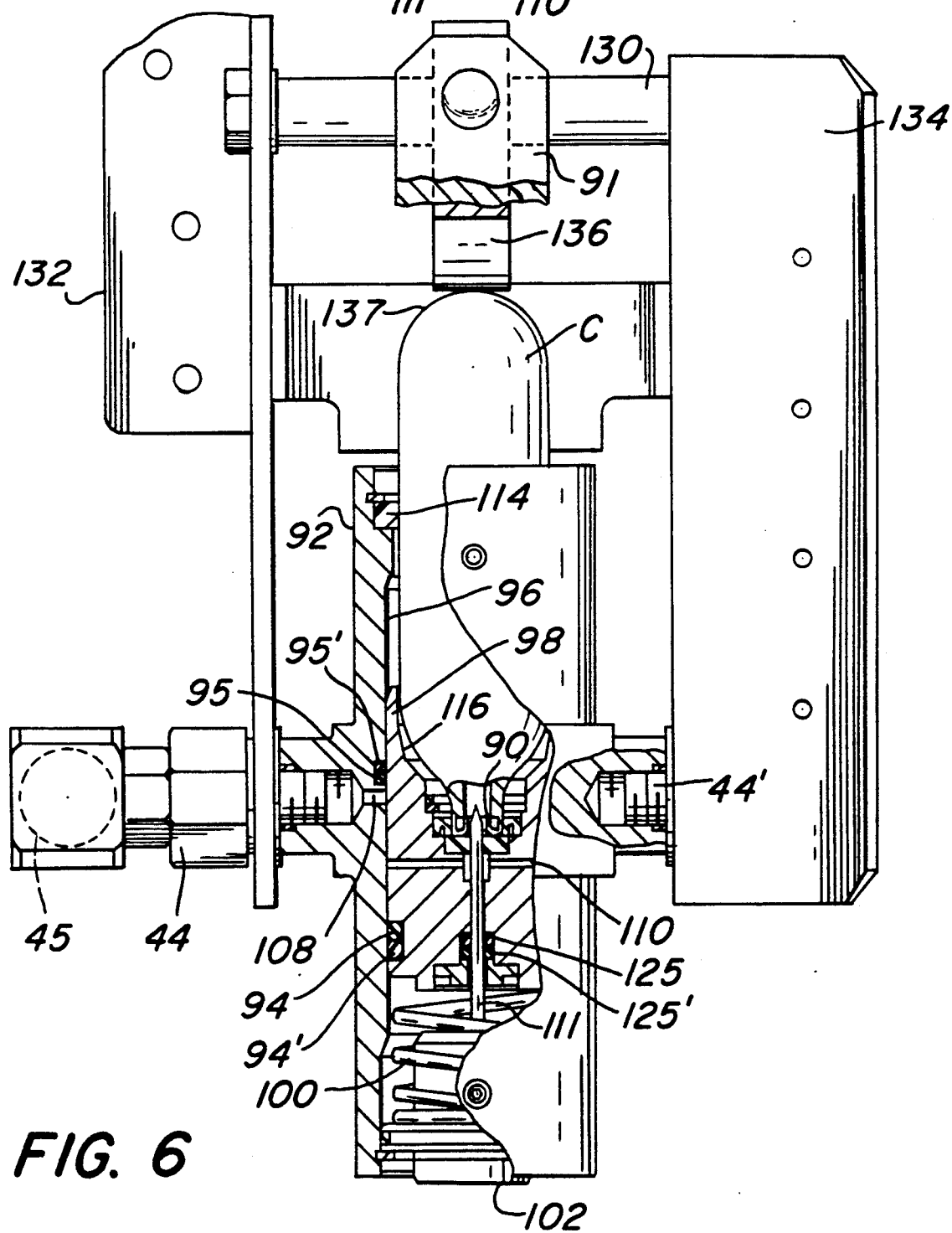

Piston 98 is provided with internal flow passage means arranged to communicate with the cartridge opening for delivering the released propane gas from the cartridge interior to the cylindrical peripheral surface of piston 98 whereat said piston is in sliding contact with internal cylinder 96. Such means comprises a longitudinal passage 109 aligned with the central space in face seal washer 118 and four radially extending passages 118 extending in a transverse plane from the passage 109 radially outwardly to the periphery of piston 98 as is best shown in FIG. 8. A screen filter 122 is positioned in a counterbore at the upper end of passage 109 for filtering out contaminants that could get into the propane gas flow.

Figure 5:
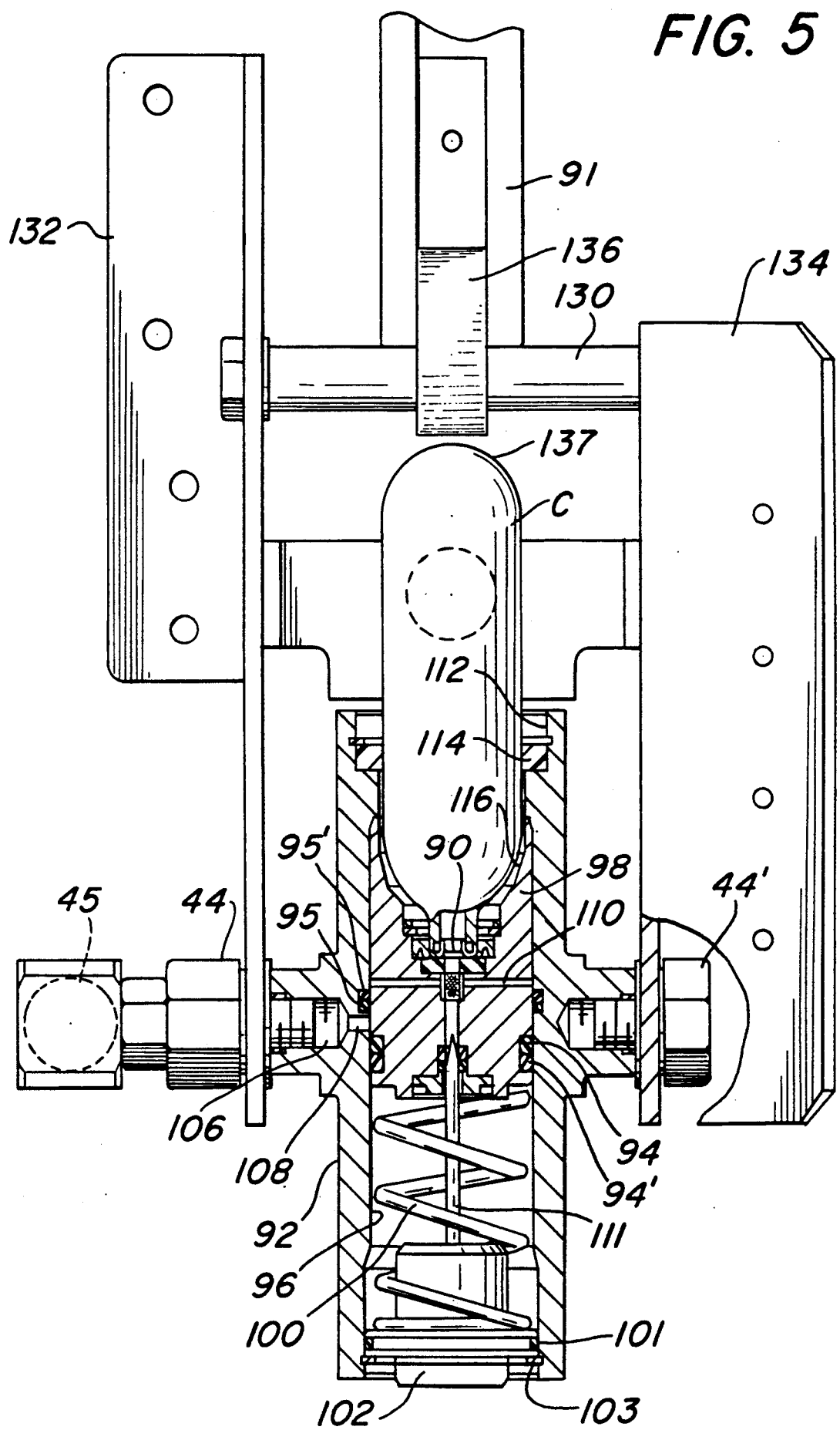

Means are provided for sealing the pin 111 with the piston 98. To this end, pin 111 extends through a counterbore 124 in the lower end of passage 109 and a pair of O-rings 125 and 125' are held within counterbore 124 by a retainer 126 to provide a seal between pin 111 and the cylindrical surface of counterbore 124 in piston 98. As shown in FIG. 5, pin 111 extends past the counterbore 124 and into passage 109 when the piston is in its upper or rest position.

As stated above, puncturing device 40 is constructed and arranged to provide a check valve function that closes and isolates the propane system from moisture and contaminants in the air as well as preventing the escape of residual propane vapors into the atmosphere. As best shown in FIG. 9, body 92 has a side outlet passage means provided by a small outlet chamber 106 and an outlet port 108 which communicates with the interior of the internal chamber 96, said passage means communicating with the flow passage 129 in the outlet fitting 44 which delivers the propane from the puncturing device 40 to the hose 45 as discussed above. Outlet port 108 is the only opening in the sidewall of internal chamber 96. In accordance with said check valve function of the puncturing device, outlet port 108 is arranged to communicate with internal chamber 96 at a location immediately below the seal provided by the O-ring seals 95 and 95'. Further, the passages 110 within piston 98 are located to be above the seal provided by the O-ring seals 94 and 94'. Also, when the piston 98 is in the rest position, which is its normal position when the puncturing device 40 is not being operated to puncture a cartridge, the parts are constructed and arranged so that the internal passages 110 communicate with the internal passage chamber 96 at a location above the seal provided by O-ring seals 95 and 95'. Thus, when the piston is in the rest position shown in FIG. 5, the O-ring seals 94 and 94' and 95 and 95' are spaced apart axially and have the outlet port 108 located therebetween whereby said seals check any flow and isolate the propane system from the moisture and contaminants in the air. Further, the other sealing means including the seals 125 and 125' which seal the passage 109 and the seal 114 which seals the upper end of the internal cylinder 96 as well as the seals 118 and 120 which cooperate with the cartridge opening prevent the escape of any residual propane vapors within the puncturing device 40 from escaping into the atmosphere. O-ring seals 125 and 125' are made of the same (different temperature) compounds as O-ring seals 94 and 94', respectively.

Means are provided for manually moving a cartridge C downwardly onto the pin 111 of the puncturing device 40 during a puncturing operation. To this end, handle 91 is pivotally mounted at its end on a horizontally extending pivot pin 130 which is supported on the brackets 132 and 134 which mount the puncturing device 40 on the frame 10. Also mounted at the pivotal end of handle 91 is a cam 136 which is constructed and arranged to contact the rounded end 137 of cartridge C when said cartridge is positioned in the inverted condition in the puncturing device 40.

FIGS. 4-7 illustrate the successive steps in the operation of the puncturing device 40 to break the sealing diaphram 90 on a cartridge C to release the contained compressed propane. Prior to a propane releasing, actuating operation of the puncturing device 40, the handle 91 is normally in its lifted or raised position as shown in FIG. 5 and an expended cartridge C from the prior starting operation is removed and a new sealed cartridge C is taken from the propane storage rack 200 and, after removing the plastic cap 220 from the small end thereof, the new cartridge C is inserted into the puncturing device 40 in a manner to be sure that its lower end is seated on the sealing washer 118. In this position, which may be termed the rest or start position, cam 136 rests on the rounded end 137 of cartridge C as shown by the dashed lined position indicated at A in FIG. 4. As the handle 91 is moved downwardly through an actuating movement, cam 136 pushes cartridge C and piston 98 downwardly onto the puncture pin 111 which is supported in a fixed position therebeneath as discussed above. During this actuating movement, spring 100 is compressed as piston 98 is moved downwardly. As the upper end of pin 111 passes through diaphram 90 extending across the end of the cartridge opening, a hole for the passage of propane gas is formed. In the solid line shown in FIG. 4 the handle 91 is in an intermediate position of the handle movement from the position shown in FIG. 5 to the position shown in FIG. 6, said latter figure showing the lowermost position of a cartridge C and piston 98 during the actuating movement. In this position, pin 111 has punctured diaphram 90 to create a hole therein for the release of the propane. As handle 91 continues its downward actuating movement from the position shown in FIG. 6 to the position shown in FIG. 7, the cam 136 moves to the dashed line position indicated generally at D in FIG. 4. As the cam 136 moves from the FIG. 6 to the FIG. 7 position, piston 98 moves upwardly, by the action of spring 100, from the position shown in FIG. 6 to a propane dispensing position shown in FIG. 7 wherein passages 110 are aligned with the outlet port 108 as best shown in FIGS. 8 and 9. The propane is now free to flow from the interior of cartridge C through the central space in seal 118 into the passage 109, outwardly through the filter 122 and into the four radially extending passages 110 into the space between internal cylinder 96 and piston 98 and into outlet passage 108. As shown in FIG. 9, passages 110 are aligned with outlet passage 108 and are, therefore, between the seals provided by the two O-rings 95 and 95' and the two O-rings 94 and 94', which seals, in conjunction with the seals 125 and 125' and face seal 118, confine the flow of the propane to the outlet port from cartridge C. It is noted that in the position shown in FIG. 9 the upper end of pin 111 is below the area where the filter 122 is located so as not to interfere with the flow of the propane. From outlet port 108, the propane flows through chamber 106 to passage 129 to the flow line 45 which directs the propane to the evaporator 41 and ultimately the engine as was discussed above.

Means are provided for mounting the body 92 to be rotatable about a horizontal axis transverse to the axial extent of said body from its normal vertically extending position to a downwardly extending position. To this end, body 92 is provided with a pair of outwardly extending portions 150 having mounting fittings 44 and 44' threadedly engaged therewith. Fittings 44 and 44' have reduced diameter portions rotatably mounted within a pair of sleeve bearings 170 and 172 which are mounted in horizontally aligned holes in the supporting brackets 132 and 134. The bearing support arrangement is best shown in FIG. 9. By reason of this rotatable mounting means, the body 92 is rotatable between the solid line and dashed line positions shown in FIG. 4. As is apparent from this figure, the body 92 may be pivoted to the downwardly extending dashed lined position to thereby prevent water, such as from rain or other sources, from entering the cavity 116 in body 92 and possibly interferring with the propane gas flow at some future starting operation. Since the engine-pump assembly is designed for emergency use on board ships, the assembly could be easily exposed to rain or other weather conditions when used on the deck of a ship. It is also possible that the sea water could enter the puncturing device 40 during use on board a ship.

In accordance with the invention, there is also provided a novel propane storage rack 200 which is mounted on the frame 10 at a location as described above. Storage rack 200 is designed to retain eight propane cartridges C in an arrangement to provide protection for the cartridges from heat and fire in the event that they should become engulfed in flames, etc. Briefly, this is achieved by insulating the large diameter cylindrical body portion of the cartridge and leaving the small end portion containing sealing diaphram 90 exposed. Accordingly, not only is the maximum safe exposure time to fire greatly increased, but also the ultimate breaking open of cartridge C is done in a controlled fashion. Further, since the cartridge's large body portion is cooler (because it is more insulated from the fire) than the cartridge end portion, the end will rupture first in a prolonged immersion in fire or heat. This rupture will be a small opening in diaphram 90 which produces a controlled plume of flame from the cartridge opening instead of an explosion. Further, the cartridge C will remain in its stored position the storage rack 200 eliminating possible shrapnel or explosion hazards.

The storage rack 200 is best shown in FIGS. 1 and 3 and comprises an L-shaped bracket 202, the lower leg of which is mounted to a horizontal skid 204 at the lower end of frame 10 by means of an adapter bracket 206 and fasteners 208. Eight hollow cylindrical tube shields 215 are secured in side-by-side relation by means of a tube retainer 213 secured in spaced apart relation to the upper leg of bracket 202 by means of four mounting screws 211 and cooperating nuts 212. A strip shield 216 is mounted on the lower leg of bracket 202 to extend therealong and provide a support and insulating shield for the bottom of the cartridges C contained in the tube shields 215. Each tube shield 215 is arranged to extend in a generally upright direction (as shown in FIG. 3) to receive and contain a cartridge C in a manner to enclose the cylindrical body portion thereof and with the small end portion thereof extending outside of said tube shield 215. As shown in FIG. 1, cartridges C are provided with end caps 220. A cartridge cushion 217 is secured to extend along the upper end of the upper leg of bracket 202 and is provided with a resilient portion 221 adapted to contact the neck protion of each of the cartridges C in storage rack 200 as is best shown in FIG. 13. Cushion 217 serves to hold the cartridges C in the stored position in the storage rack 200 even if the engine-pump assembly should be turned accidentally from the normal upright position thereof.

It will thus be apparent that the cartridges C are insulated both along their bottom and throughout their large cylindrical portion. To this end, the tube shields 215 are made of a material having good heat insulation properties, such as for example, a composite melamine resin with fiberglass reinforcement, which material also has a high strength.

It is to be noted that the propane system functions to assist the starting of the engine. From the beginning of the starting sequence the JP5 fuel is supplied to the engine and burns along with the propane. After the propane is exhausted (in less than 30 seconds), the JP5 fuel continues to burn without assistance from the propane.

WHAT IS CLAIMED IS:

1. In an internal combustion engine adapted to operate on a running fuel of low volatility such as a kerosene based fuel or a diesel fuel, the combination comprising:
   a fuel inlet means for delivering fuel to the engine combustion chamber,
   means for supplying said running fuel to said fuel inlet means, and
   means for supplying a starting fuel having a relatively high volatility to said fuel inlet means for use in starting the engine,
   said means for supplying said running fuel comprising a carburetor means including
   a carburetor bowl,
   an idle fuel supply passage means having an idle orifice restriction therein,
   a high speed fuel supply passage means having a high speed orifice restriction therein, and
   a fuel enrichment supply passage means constructed and arranged to bypass said high speed orifice and said idle orifice to compensate for the increased viscosity of said running fuel at extremely low temperatures by providing a substantial supply of fuel at said low temperatures.

2. The combination according to claim 1 wherein said starting fuel supply means comprises a sealed, pressurized cartridge containing a limited supply of said starting fuel,
   means cooperating with said cartridge to release the limited supply of pressurized fuel contained therein, and
   conduit means for delivering said released fuel from said cartridge to said carburetor means.

3. The combination according to claim 2 wherein said conduit means is arranged to flow through an evaporator means including a bowl for containing water.

4. In an internal combustion engine adapted to operate on a running fuel of low volatility such as a kerosene based fuel or a diesel fuel, the combination comprising:
   fuel supply means for delivering fuel to the engine combustion chamber,
   said fuel supply means including an intake manifold for delivering a mixture of air and fuel to the engine combustion chamber, and carburetor means for supplying fuel to said intake manifold,
   said carburetor means including
   a throat portion,
   a carburetor bowl for containing a quantity of fuel,
   a first fuel supply passage means for delivering fuel from said carburetor bowl to said throat portion, said first fuel supply passage means including an idle tube orifice for controlling flow therethrough,
   a second fuel supply passage means for delivering fuel from said carburetor bowl to said throat portion, said second fuel supply passage means including a high speed orifice for controlling flow therethrough, and
   fuel enrichment means for supplying an additional amount of fuel from said carburetor bowl to said throat portion and including a conduit means for the flow of fuel from said carburetor bowl to said first fuel supply passage means at a location downstream of said idle tube orifice to bypass the same and to said second fuel supply passage means at a location downstream of said high speed orifice to bypass the same.

5. The combination according to claim 4 including a flow adjustable valve means for controlling the flow of fuel through said conduit means of said fuel enrichment means, said valve being adjustable to permit a maximum amount of flow when the ambient temperature is at a low point and to permit less flow as the ambient temperature increases from said low point.

6. A fuel supply for an internal combustion engine having a fuel inlet means for delivering a fuel-air mixture to the engine combustion chamber comprising:
   means for supplying a running fuel to the fuel inlet means for use in the normal operation of the engine,
   said running fuel having a relatively low volatility, and
   means for supplying a starting fuel to the fuel inlet means for use in starting the engine,
   said starting fuel having a relatively high volatility,
   said starting fuel means comprising a sealed cartridge containing a pressurized supply of a starting fuel,
   means for releasing the supply of pressurized fuel, and
   conduit means for delivering said released fuel to said fuel inlet means,
   said conduit means containing an evaporator means including a bowl for containing a quantity of water and an evaporator tube extending through said bowl and arranged so as to provide for heat transfer between the released pressurized fuel flowing through said evaporator tube and the water contained in said bowl whereby the heat of the water is utilized for the evaporation of the released pressurized fuel.

7. The combination according to claim 6 wherein said starting fuel supply means comprises a sealed pressurized cartridge containing a limited supply of propane, and including a pump driven by said engine, said bowl providing a priming bowl for containing water for use in priming said pump, said evaporator tube extending through said priming bowl so as to be immersed in water contained therein.

8. A fuel supply for an internal combustion engine having a fuel inlet means for delivering a fuel-air mixture to the engine combustion chamber comprising:
   means for supplying a starting fuel to the fuel inlet means for use in starting the engine,
   said starting fuel having a relatively high volatility,
   said starting fuel supply means comprising a sealed pressurized cartridge containing a limited supply of said starting fuel, said cartridge having a discharge passage closed by a puncturable seal, and means for puncturing said seal to release all of the limited supply of said pressurized starting fuel contained in said cartridge, said puncturing means comprising:

a body having an elongated cylindrical chamber and outlet passage means communicating with said chamber and extending to the exterior of said body, a piston slidably mounted in said cylindrical chamber for movement between a plurality of positions, spring means at one end of said body for biasing said piston toward a rest position at the other end of said body, a prong fixedly mounted at said one end of said body to extend axially along said cylindrical chamber, said piston having an axial bore extending therethrough and adapted to slidably receive said prong, said piston being constructed and arranged for receiving the discharge end of said cartridge for mounting the same with said discharge end in alignment with said axial bore when said cartridge is inserted in said puncturing means, and actuating means for moving said cartridge from its inserted position and said piston supporting the same from its rest position toward said prong through an actuating movement wherein said prong punctures said seal to release said starting fuel into said axial bore, said piston including radial passage means for the flow of starting fuel from said axial bore to the circumference thereof for communicating with said cylindrical chamber from which said starting fuel flows through said outlet passage means of said body, and an outlet fitting mounted on said body for discharging starting fuel from said outlet passage means for flow to the fuel inlet means for the engine.

9. A fuel supply according to claim 8 including seal means for blocking the flow of outside air into said outlet passage means in said body when said piston is in its rest position.

10. A fuel supply according to claim 9 wherein said seal means comprises a first O-ring seal means extending circumferentially around said piston for providing a circumferential seal between the exterior of said piston and said cylindrical chamber and a second O-ring seal means extending circumferentially around said cylindrical chamber for providing a circumferential seal between the exterior of said piston and said cylindrical chamber, said first and second O-ring seal means being located in axially spaced apart relation, said outlet passage means communicating with said cylinder at a location between said spaced apart O-ring seal means when said piston is in its rest position, said radial passage means in said piston being located to communicate with said cylindrical chamber at a location outside of said spaced apart first and second O-ring seal means when said piston is in its rest position.

11. A fuel supply according to claim 10 wherein said first and second O-ring seal means each include a pair of O-rings contained in grooves wide enough to contain the same, one of each pair of said O-rings being made of a material for providing a good seal at a low temperature and the other of each pair of said O-rings being made of a different material for providing a good seal at temperatures higher than said low temperature.

12. A fuel supply according to claim 8 wherein said cartridge body is mounted to be rotatable about an axis transverse to said axial extent of said cylindrical chamber therein to a downwardly extending position.

13. A fuel supply for an internal combustion engine having fuel inlet means for delivering a fuel-air mixture to the engine combustion chamber by way of the engine manifold comprising:

means for supplying a starting fuel to the fuel inlet means for use in starting the engine, said starting fuel having a relatively high volatility, said starting fuel supply comprising a sealed cartridge containing a pressurized supply of said starting fuel, means for releasing the supply of pressurized fuel, and conduit means for delivering said released starting fuel to said fuel inlet means of the engine, said conduit means containing an evaporator means including a bowl for containing a quantity of water and an evaporator tube extending through said bowl and arranged so as to provide for heat transfer between the released pressurized fuel flowing through said evaporator tube and water contained in said bowl, said conduit means including a pressure regulator means for controlling the flow of starting fuel from the evaporator to said fuel inlet means of the engine, said pressure regulator means comprising a diaphragm operated valve responsive to the pressure in the engine manifold to block the flow of said starting fuel through said conduit means unless a predetermined vacuum pressure exists in the engine manifold.

14. An internal combustion engine according to claim 13 wherein said pressure regulator means comprises a prime button for bypassing said flow blocking function of said diaphragm operated valve for use in priming the engine, said prime button being arranged to be manually movable to actuate said diaphragm operated valve to an open condition.

* * * * *